US008059580B2

(12) United States Patent
Grosbach (10) Patent No.: US 8,059,580 B2
(45) Date of Patent: Nov. 15, 2011

(54) INTERNET MICRO CELL

(75) Inventor: Roy G. Grosbach, Evergreen, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1011 days.

(21) Appl. No.: 10/846,064

(22) Filed: May 14, 2004

(65) Prior Publication Data

US 2005/0254451 A1 Nov. 17, 2005

(51) Int. Cl.
*H04Q 7/00* (2006.01)
(52) U.S. Cl. .............. 370/328; 370/338; 370/310.2; 455/445; 455/446; 455/422.1; 455/41.2
(58) Field of Classification Search ............. 455/455, 455/426.1, 241.2, 445
See application file for complete search history.

(56) References Cited

U.S. PATENT DOCUMENTS

| | | | | |
|---|---|---|---|---|
| 5,790,800 | A * | 8/1998 | Gauvin et al. ............. | 709/227 |
| 5,956,331 | A * | 9/1999 | Rautiola et al. ............. | 370/338 |
| 6,697,355 | B1 * | 2/2004 | Lim ............................. | 370/352 |
| 6,795,421 | B1 * | 9/2004 | Heinonen et al. ............. | 370/338 |
| 6,804,492 | B2 * | 10/2004 | Kay ............................. | 455/12.1 |
| 6,961,575 | B2 * | 11/2005 | Stanforth ..................... | 455/445 |
| 7,046,652 | B2 * | 5/2006 | Hyun et al. .................. | 370/342 |
| 7,266,393 | B2 * | 9/2007 | Latva-Aho et al. .......... | 455/561 |
| 2002/0085516 | A1 | 7/2002 | Bridgelall | |
| 2002/0105932 | A1 * | 8/2002 | Miya ........................... | 370/338 |
| 2002/0147008 | A1 | 10/2002 | Kallio | |
| 2004/0072593 | A1 | 4/2004 | Robbins | |
| 2004/0255008 | A1 * | 12/2004 | Olsen et al. .................. | 709/220 |

FOREIGN PATENT DOCUMENTS

| | | |
|---|---|---|
| JP | 2003110570 | 4/2003 |
| JP | 200464655 | 2/2004 |
| JP | 200496169 | 3/2004 |
| WO | 02054820 | 7/2002 |

OTHER PUBLICATIONS

Translation of Notification of Reason for Rejection, Dispatched Jun. 15, 2010, 3 pages.

* cited by examiner

*Primary Examiner* — Kamran Afshar
*Assistant Examiner* — Sayed T Zewari (57) ABSTRACT

A wireless communications network and a method, system, computer program product for implementing the wireless communications network is provided. In one embodiment, the wireless communications network includes an internet micro cell, an internet gateway, and a wireless service provider telephone switch. The internet micro cell is configured to receive wireless data transmissions from a wireless device, such as a wireless mobile telephone, and to transmit the data transmission via a wired medium, such as, for example, an Ethernet transmission line, to the internet gateway. The internet gateway then sends the information to the wireless service provider's telephone switch to then be routed to the appropriate recipient through the wireless service provider's wireless mobile telephone network. The internet micro cell is also configured to receive data from the internet service provider's telephone switch routed, via the Internet, and to then wirelessly transmit the information to the wireless mobile telephone.

12 Claims, 6 Drawing Sheets

Figure 1

(Prior Art)

Figure 2

(Prior Art)

INTERNET MICRO CELL

BACKGROUND OF THE INVENTION

1. Technical Field

The present invention relates generally to telecommunications and, more specifically to wireless communications.

2. Description of Related Art

Wireless mobile telephones are becoming more common place throughout the world every year. With every year that passes, more and more people become more accustomed to being able to talk on the telephone and/or send and receive messages via the wireless mobile telephone anywhere they happen to roam. Furthermore, many businesses have evolved such that they rely ever increasingly upon wireless mobile telephone access. Thus, failure to connect to the wireless network results at the very least in frustration and, often times, in lost business opportunities, revenue, and/or efficiency.

However, such an occurrence is more common than would be desirable, especially in some homes and public places, such as, for example, office buildings, restaurants, and retail establishments, due to poor cellular coverage and/or interference from these man made structures. Furthermore, analog cellular coverage is being phased out, leading to reduced coverage in rural areas. Additionally, in many public places, such as sports arenas, stadiums, and shopping malls, a high volume of calls places too high of a load on cell towers causing many users to lose coverage and/or have their telephone calls "dropped" by the tower.

It would be desirable to have a device, method, system, and computer program product which would alleviate the problems associated with poor cellular coverage and thus, increase connectivity between the wireless devices and the wireless service providers, thereby decreasing the inconvenience to users of having calls dropped or not being able to receive a signal from the wireless service providers' networks.

SUMMARY OF THE INVENTION

The present invention provides wireless communications network and a method, system, computer program product for implementing the wireless communications network. In one embodiment, the wireless communications network includes an internet micro cell, an internet gateway, and a wireless service provider telephone switch. The internet micro cell is configured to receive wireless data transmissions from a wireless device, such as a wireless mobile telephone, and to transmit the data transmission via a wired medium, such as, for example, an Ethernet transmission line, to the internet gateway. The internet gateway then sends the information to the wireless service provider's telephone switch to then be routed to the appropriate recipient through the wireless service provider's wireless mobile telephone network. The internet micro cell is also configured to receive data from the internet service provider's telephone switch routed, via the Internet, and to then wirelessly transmit the information to the wireless mobile telephone.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
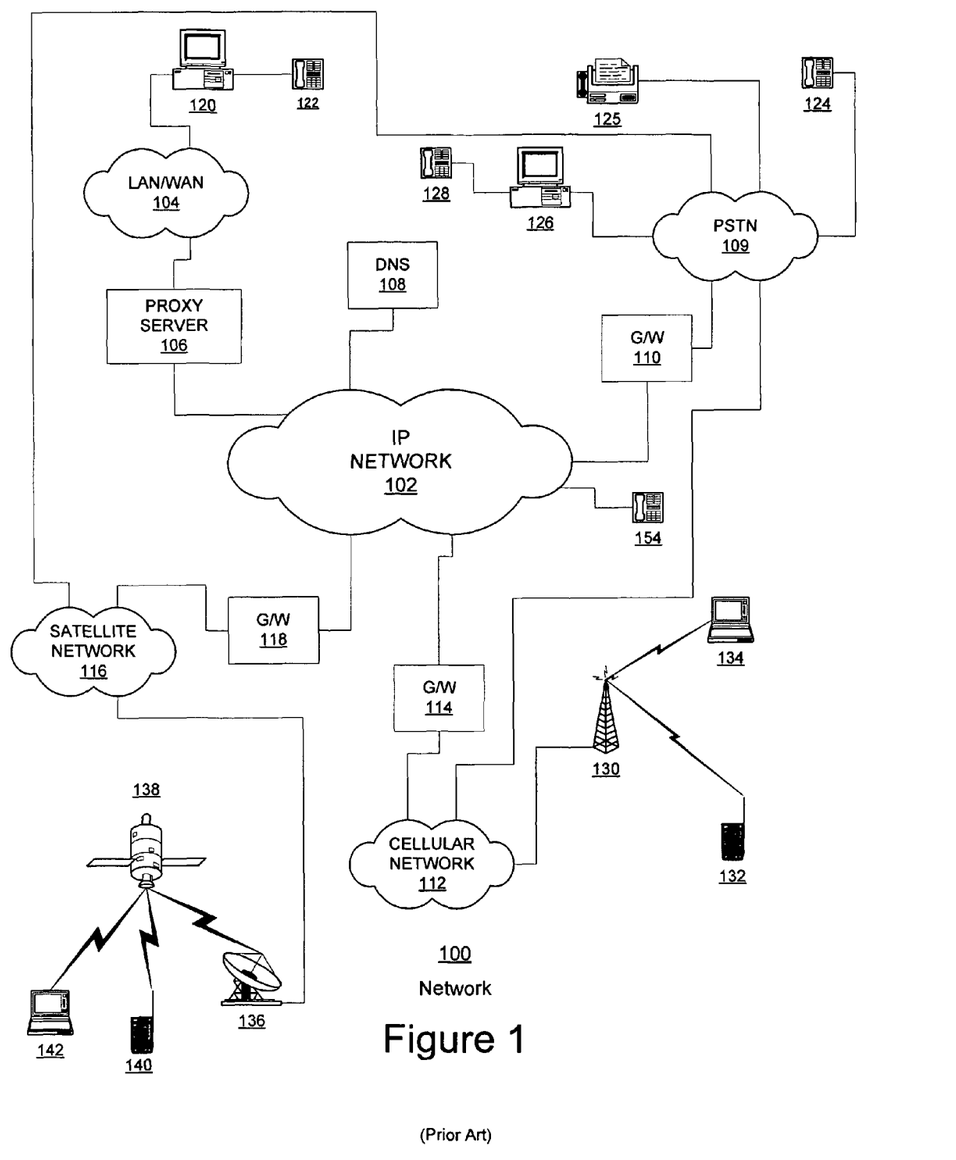
FIG. 1 depicts a system diagram illustrating a distributed data processing system illustrating communication between both wired and wireless devices according to the prior art.

With reference now to the figures, and in particular with reference to FIG. 1, a system diagram illustrating a distributed data processing system illustrating communication between both wired and wireless devices according to the prior art is depicted.

Distributed data processing system 100 is a plurality of interconnected heterogeneous networks in which the present invention may be implemented. As illustrated, distributed data processing system 100 contains an Internet Protocol (IP) network 102, a Local Area Network (LAN)/Wide Area Network (WAN) 104, the Public Switched Telephone Network (PSTN) 109, a cellular wireless network 112, and a satellite communication network 116. Networks 102, 104, 109, 112, and 116 may include permanent connections, such as wire or fiber optic cables, or temporary connections made through telephone connections.

IP network 102 may be the publicly available IP network (the Internet), a private IP network, or a combination of public and private IP networks. In any case, IP network 102 operates according to the Internet Protocol and routes packets among its many switches and through its many transmission paths. IP networks are generally known in the art to be expandable, fairly easy to use and heavily supported. Coupled to IP network 102 is a Domain Name Server (DNS) 108 to which queries may be sent, such queries each requesting an IP address based upon a Uniform Resource Locator (URL). IP network 102 supports 32 bit IP addresses as well as 128 bit IP addresses, which are currently in the planning stage.

LAN/WAN 104 couples to IP network 102 via a proxy server 106 (or another connection). LAN/WAN 104 may operate according to various communication protocols, such as the Internet Protocol, the Asynchronous Transfer Mode (ATM) protocol, or other known packet switched protocols. Proxy server 106 serves to route data between IP network 102 and LAN/WAN 104. A firewall that precludes unwanted communications from entering LAN/WAN 104 may also be located at the location of proxy server 106.

Computer 120 couples to LAN/WAN 104 and supports communications with LAN/WAN 104. Computer 120 may employ the LAN/WAN and proxy server 106 to communicate with other devices across IP network 102. Such communications are generally known in the art and will not be further described herein except to expand upon the teachings of the present invention. As is also shown, phone 122 couples to computer 120 and may be employed to initiate IP Telephony communications with another phone or voice terminal using IP Telephony. In such an IP telephony system, a gatekeeper is deployed by a service provider to manage IP telephony for its users. An IP phone 154 connected to IP network 102 (or other phone, e.g., phone 124) may communicate with phone 122 using IP telephony.

PSTN 109 is a circuit switched network that is primarily employed for voice communications, such as those enabled by a standard phone 124. However, PSTN 109 also supports the transmission of data. Data transmissions may be supported to a tone based terminal, such as a FAX machine 125, to a tone based modem contained in computer 126, or to another device that couples to PSTN 109 via a digital connection, such as an Integrated Services Digital Network (ISDN) line, an Asynchronous Digital Subscriber Line (ADSL), or another digital connection to a terminal that supports such a connection. As illustrated, a voice terminal, such as phone 128, may couple to PSTN 109 via computer 126 rather than being supported directly by PSTN 109, as is the case with phone 124. Thus, computer 126 may support IP telephony with voice terminal 128, for example.

Cellular network 112 supports wireless communications with terminals operating in its service area (which may cover a city, county, state, country, etc.). As is known, cellular network 112 includes a plurality of towers, e.g., 130, that each service communications within a respective cell. Wireless terminals that may operate in conjunction with cellular network 112 include wireless handsets 132 and wirelessly enabled laptop computers 134, for example. Wireless handsets 132 could be, for example, personal digital assistants, wireless or cellular telephones, or two-way pagers. Cellular network 112 couples to IP network 102 via gateway 114. For data communications, such as Wireless Application Protocol (WAP), a WAP gateway 114 may be utilized. "Tone based data" traffic, as mentioned above, is routed through the direct connection between cellular network 112 and PSTN 109.

Wireless handsets 132 and wirelessly enabled laptop computers 134 may communicate with cellular network 112 using a wireless application protocol (WAP). WAP is an open, global specification that allows mobile users with wireless devices, such as, for example, mobile phones, pagers, two-way radios, smartphones, communicators, personal digital assistants, and portable laptop computers, to easily access and interact with information and services almost instantly. WAP is a communications protocol and application environment and can be built on any operating system including, for example, Palm OS, EPOC, Windows CE, FLEXOS, OS/9, and JavaOS. WAP provides interoperability even between different device families.

WAP is the wireless equivalent of Hypertext Transfer Protocol (HTTP) and Hypertext Markup Language (HTML). The HTTP-like component defines the communication protocol between the handheld device and a server or gateway. This component addresses characteristics that are unique to wireless devices, such as data rate and round-trip response time. The HTML-like component, Wireless Markup Language (WML), defines new markup and scripting languages for displaying information to and interacting with the user. This component is highly focused on the limited display size and limited input devices available on small, handheld devices. For example, a typical cell phone may have only a 4×10-character display with 16-gray levels and only a numeric keypad plus up/down volume keys.

Cellular network 112 operates according to an operating standard, which may be the Advanced Mobile Phone System (AMPS) standard, the Code Division Multiple Access (CDMA) standard, the Time Division Multiple Access (TDMA) standard, or the Global System for Mobile Communications or Groupe Speciale Mobile (GSM), for example. Independent of the standard(s) supported by cellular network 112, cellular network 112 supports voice and data communications with terminal units, e.g., 132 and 134.

Satellite network 116 includes at least one satellite dish 136 that operates in conjunction with a satellite 138 to provide satellite communications with a plurality of terminals, e.g., laptop computer 142 and satellite handset 140. Satellite handset 140 could also be a two-way pager. Satellite network 116 may be serviced by one or more geosynchronous orbiting satellites, a plurality of medium earth orbit satellites, or a plurality of low earth orbit satellites. In any case, satellite network 116 services voice and data communications and couples to IP network 102 via gateway 118 or, alternatively, couples directly to PSTN 109 for voice traffic.

However, one problem with a communication system such as depicted in FIG. 1 is that wireless devices, such as, for example, wireless devices 132 and 134, may sometimes be out of range of a communication tower 130, thereby rendering those devices useless. The reasons that the wireless device is out of range are myriad. Common reasons are, however, that the wireless device is located in a region with sparse tower coverage, such as a rural area, or that the communication with the tower is blocked or interfered with by, for example, an office building or other structure.

Figure 2:
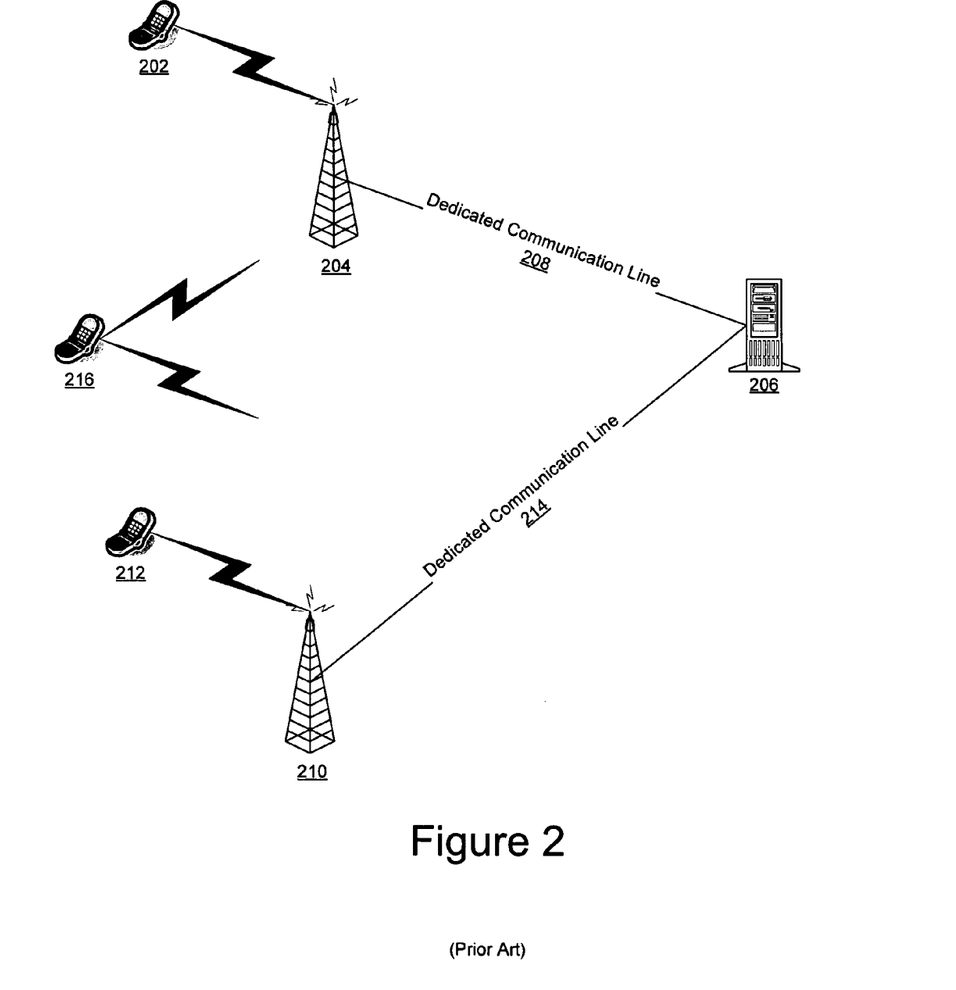
FIG. 2 depicts a wireless communication system of the prior art.

To more fully appreciate the problem, we refer now to FIG. 2, which depicts a wireless communication system of the prior art. Wireless communication system 200 includes a plurality of communication towers, such as, for example, towers 204 and 210, as well as a plurality of wireless devices, such as, for example, wireless devices 202, 212, and 216. Wireless devices 202 and 212 communicate with towers 204 and 210 respectively, which in turn have dedicated communications lines 208 and 214 with a cell provider phone switch 206. Cell provider phone switch 206 in turn provides a communication link with a communication network, such as depicted in FIG. 1 above. Thus, wireless devices 202 and 212 may communicate with each other or with other devices within a communication network.

However, wireless device 216 is outside the range to communicate with either tower 204 or tower 210. Thus, wireless device 216 is unable to communicate with any device until it is moved within range of a tower, such as, for example, either one of towers 204 and 210.

Figure 3:
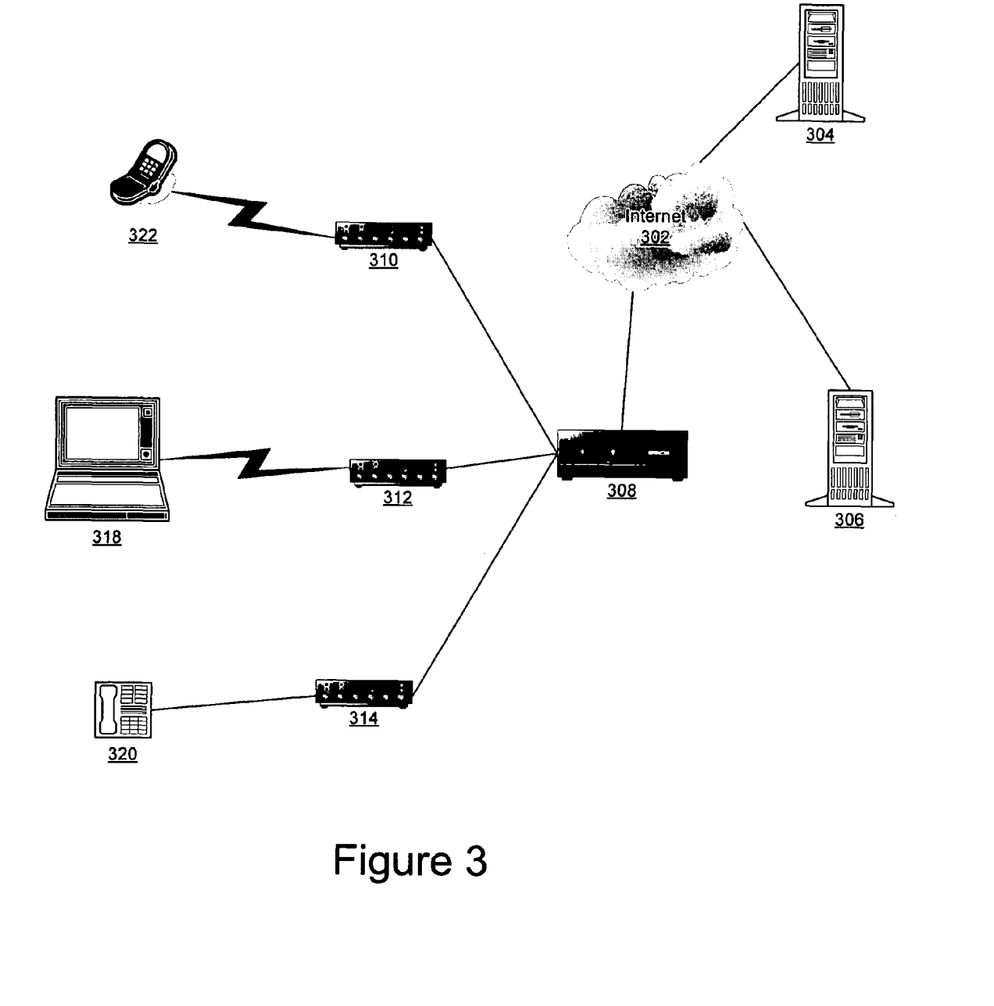
FIG. 3 depicts a pictorial diagram illustrating an internet micro cell wireless communication system in accordance with one embodiment of the present invention.

Turning now to FIG. 3, a pictorial diagram illustrating an internet micro cell wireless communication system is depicted in accordance with one embodiment of the present invention. Internet micro cell 310 provides a wireless access point for a wireless device, such as wireless mobile phone 322 to connect into a communication system. However, rather than directly connecting via a dedicated communications line to a cell provider phone switch 304, internet micro cell 310 connects to the Internet 302 via, for example, a local Ethernet connection through gateway 308 which may be, for example, a router or switch. Typically, unlike conventional radio towers currently used by cell phone providers which may have a range of several kilometers, internet micro cells, such as internet micro cell 310, may have much smaller coverage range on the order of tens or hundreds of meters, especially when used within a home. However, the range does not necessarily have to be so limited. In its most basic form, internet micro cell 310 comprises an antenna for broadcasting and receiving communication from wireless mobile phone 322, a wired Ethernet connection for connecting to a gateway 308 to the Internet 302, an software and/or hardware for implementing a protocol for communicating with wireless device 322. Thus, wireless mobile phone 322 may connect to internet micro cell 310 via an existing or future cellular protocol or, alternatively, may utilize other protocols, such as, for example, a wireless Ethernet protocol (e.g., IEEE 802.11a, b, or g).

Currently, 2.5G and 3G cellular networks allow the cellular devices to transmit data at rates higher than the standard "tone based data" in voice networks. These transmissions are digital from the cellular device to the tower. Currently, this data service is routed through the carriers networks and connected to the internet through a gateway such as gateway 114 depicted in FIG. 1. To emulate the current situation with the internet micro cell of the present invention, the data is tunneled through the internet 302 to cell provider phone switch 304, then routed back to the internet 302 through a gateway, such as, for example, gateway 114 depicted in FIG. 1. Depending on the configuration of devices 318 and 322, in some embodiments, this communication could go directly to the internet 302, bypassing the cellular provider completely, and thus provide a cost savings to the cellular customer.

Cell provider phone switch 304 receives communication from wireless mobile phone 322 via the Internet 302 and then routes the communication on to its destination using existing analog and digital telephone networks. Communication received by cell provider phone switch 304 intended for wireless mobile phone 322 is routed through the Internet 302 to internet micro cell 310 using the internet micro cell's 310 IP address. Internet micro cell 310 then broadcasts the communication to wireless device 322. Various encryption methods and other security measures well known in the art may be implemented to ensure that communication between wireless device 322 and internet micro cell 310 are not intercepted by other devices.

Other devices may also be connected to the Internet 302 through gateway 308 as depicted in FIG. 3. For example, a wirelessly enabled lap top computer 318 may connect with gateway 308 via a wireless access point 312 and an analog telephone 320 may connect to a Voice Over IP (VOIP) telephone provider phone switch 306 through an analog telephone adapter 314. Furthermore, the communication system 300 depicted in FIG. 3 could be incorporated within a distributed data processing system such as, for example, distributed data processing system 100 depicted in FIG. 1.

The internet micro cell 310 may be placed, for example, within homes, public places with poor cell phone coverage, and public places with high volumes of cell traffic. The micro cell 310 may be portable, allowing a user to carry the internet micro cell to another location. Thus, for example, if a user is traveling internationally, the user can connect the internet micro cell 310 to broadband in the hotel room to make and receive calls at "local" rates rather than at international rates.

By installing an internet micro cell 310 in a public place with poor cell phone coverage, such as is often the case inside many modern office buildings, users in the public place who once experience poor cellular coverage now experience excellent phone coverage. In some embodiments, the internet micro cell may include an additional external antenna with additional power to cover a larger area. For example, if a theme park is located within an area of poor cellular coverage, an additional external tower may be implemented by the theme park operator to provide coverage throughout the park. The external antenna is connected however to the internet micro cell rather than to a cell provider phone switch 304.

Another use of an internet micro cell, as mentioned above, is at public places with high volumes of cell phone use. For example, why build a number of cell towers to support a stadium that is only used a few hours a week? Instead, one could use multiple internet micro cells to provide coverage inside the stadium. Bandwidth via the internet is more cost efficient than dedicated connections back to the providers. Thus, an internet micro cell in such an environment would be cost efficient.

Internet micro cells could also be used in temporary remote locations, such as at the site of natural disasters, construction sites, or the Olympic Games. Internet micro cells could also be used as a replacement for satellite phones. For example, one satellite uplink could provide coverage for multiple "standard" cell phones connected to the satellite uplink via an internet micro cell.

In order for micro cells to be of use, however, the cell provider must be able to locate the wireless mobile phone. Therefore, with reference to FIG. 4, a diagram illustrating an exemplary process flow and program function for providing the location of a wireless mobile phone to a wireless service provider is depicted in accordance with one embodiment of the present invention.

Figure 4:
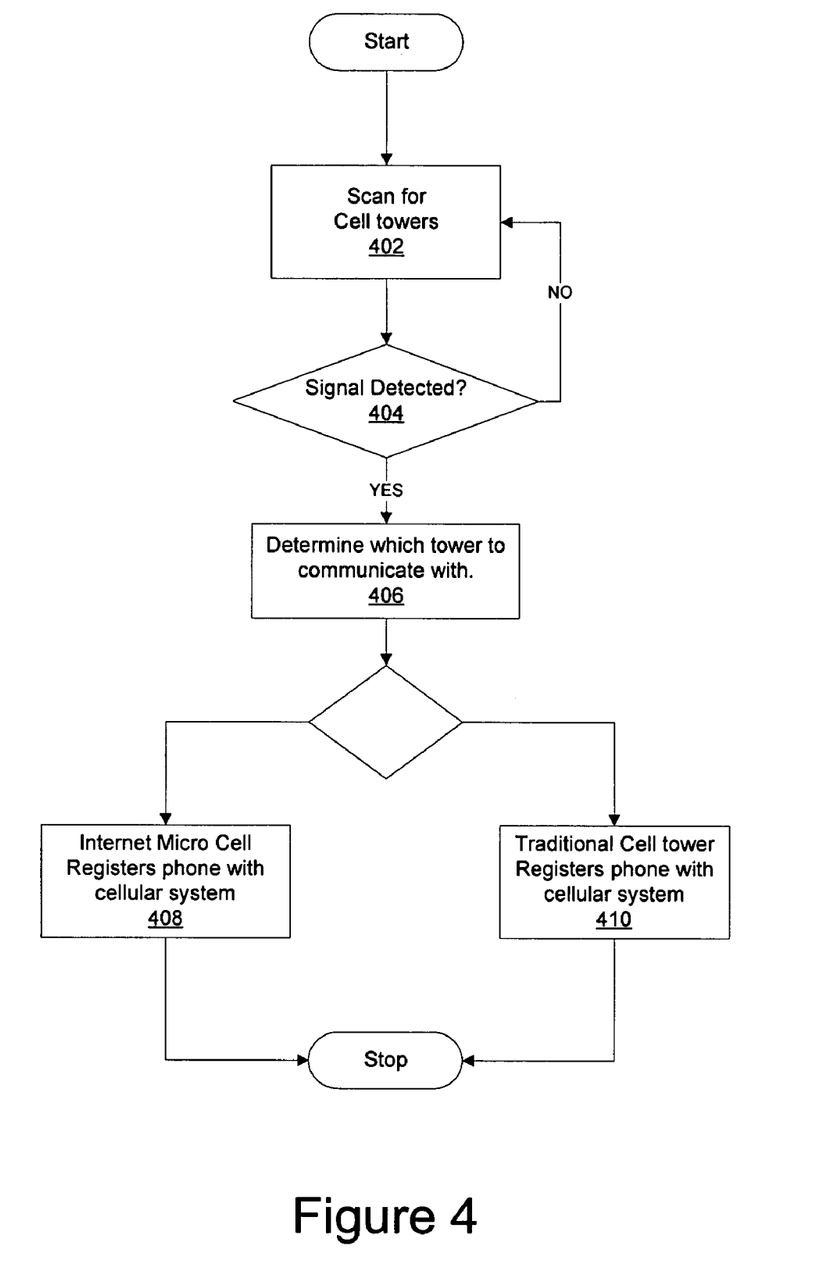
FIG. 4 depicts a diagram illustrating an exemplary process flow and program function for providing the location of a wireless mobile phone to a wireless service provider in accordance with one embodiment of the present invention.

To begin, a wireless mobile phone, such as, for example, wireless mobile phone 322 depicted in FIG. 3, scans for cell tower signal (step 402). This can be either signal from an internet micro cell 310 depicted in FIG. 3, or a traditional cell tower 204 depicted in FIG. 2. If signal is detected (step 404) then the wireless mobile phone 322 will then try to register itself with the preferred tower. The preferred is determined by many factors including but not limited to: required transmission power, signal reception strength and preferred wireless service provider (step 406). If no signal is detected, the wireless mobile phone will continue to scan for service.

The wireless mobile phone 322 then registers with the tower. If the wireless mobile phone registers with an internet micro cell 310, the internet micro cell then sends a message to the wireless service provider with the identity of the wireless mobile phone and the IP address for the internet micro cell (step 408). Thus, if a phone call or other information needs to be transmitted to the wireless mobile phone, the wireless service provider knows to route the information to the internet micro cell.

If the wireless mobile phone 322 registers with a traditional cell tower 204, the cell tower sends the usual communication to the wireless service provider which notifies the wireless service provider of the wireless mobile phone's location and identity (step 410).

Figure 5:
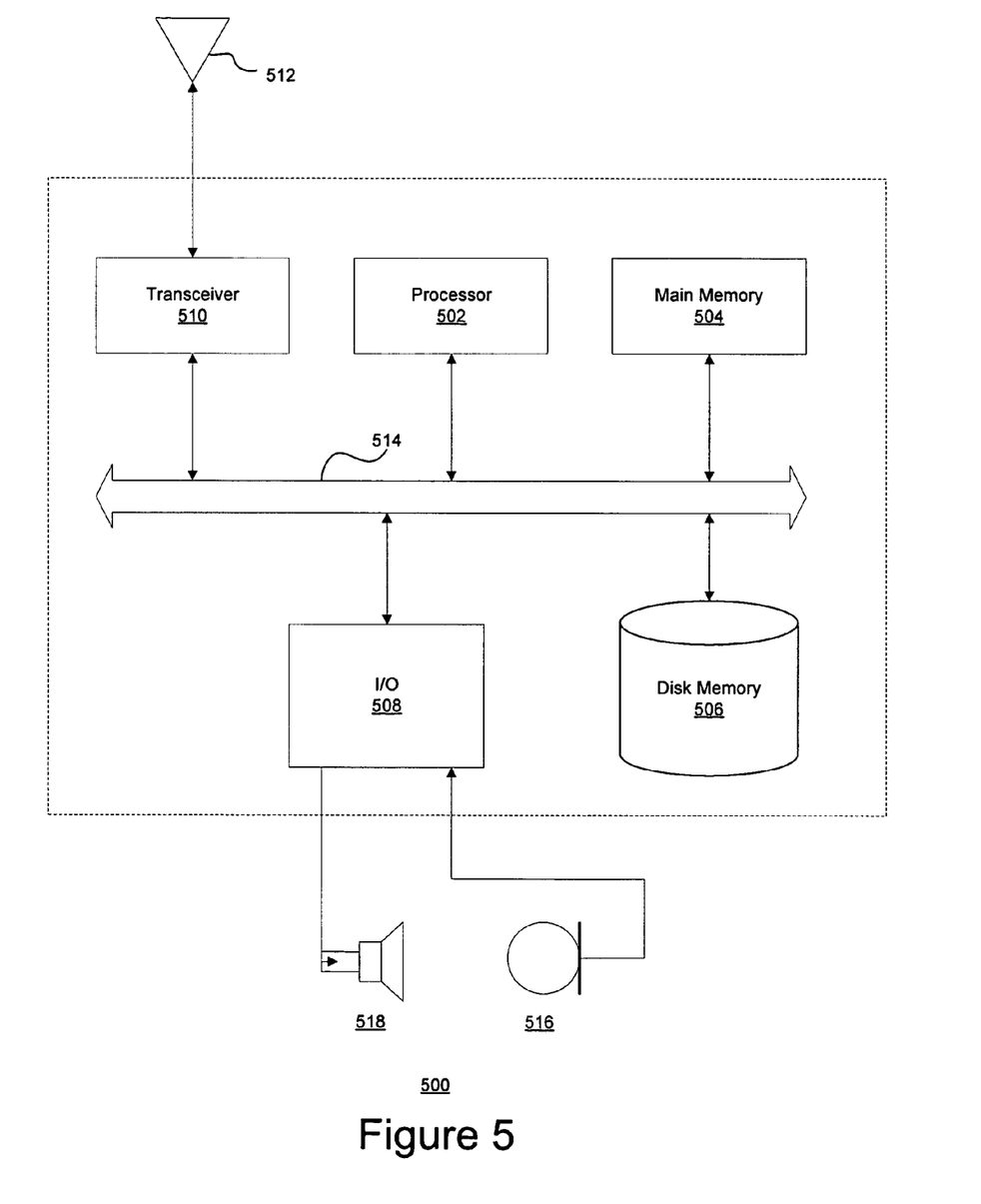
FIG. 5 depicts a block diagram of a wireless mobile phone in which the present invention may be implemented.

Turning now to FIG. 5, a block diagram of a wireless mobile phone is illustrated in which the present invention may be implemented. Wireless mobile phone 500 is an example of a phone that may be used in conjunction with the internet micro cell system of the present invention and implemented as, for example, wireless mobile phone 322 in FIG. 3. Wireless mobile phone 500 is a communication device but may also be (as depicted in FIG. 5) a data processing system (i.e., a computer) which is small and portable and may implement the process flow and program function depicted in FIG. 4. The wireless mobile phone 500 may be connected to a wireless communications network, such as, for example, network 300 depicted in FIG. 3, and provides voice as well as possibly providing fax, e-mail, and/or other types of communication. The wireless mobile phone 500 may provide other types of facilities to the user as well, such as, for example, provide a calendar and day planner. The wireless mobile phone 500 may have one or more processors 502, such as a microprocessor, a main memory 504, a disk memory 506, and an I/O 508 such as a keypad (or other input device) and a screen or monitor. The wireless mobile phone 500 includes a wireless transceiver 510 connected to an antenna 512 configured to transmit and receive wireless communications both with a traditional cell tower and with an internet micro cell. No changes to existing mobile phone architecture are necessary in order to communicate with an internet micro cell. However, additional functionality not typically included with current mobile phones may be included as well. For example, mobile phone 500 may be enabled to comply with both standard cell phone telecommunications protocols as well as other protocols, such as, for example, wireless Ethernet protocols.

The processor 502, memories 504, 506, I/O 508, and transceiver are connected to a bus 504. The bus 504 transfers data, i.e., instructions and information, between each of the devices connected to it. The I/O 508 may permit faxes, e-mail, or optical images to be displayed on a monitor or printed out by a printer. The I/O 508 may be connected to a microphone 516 and a speaker 518 so that voice or sound information may be sent and received.

Figure 6:
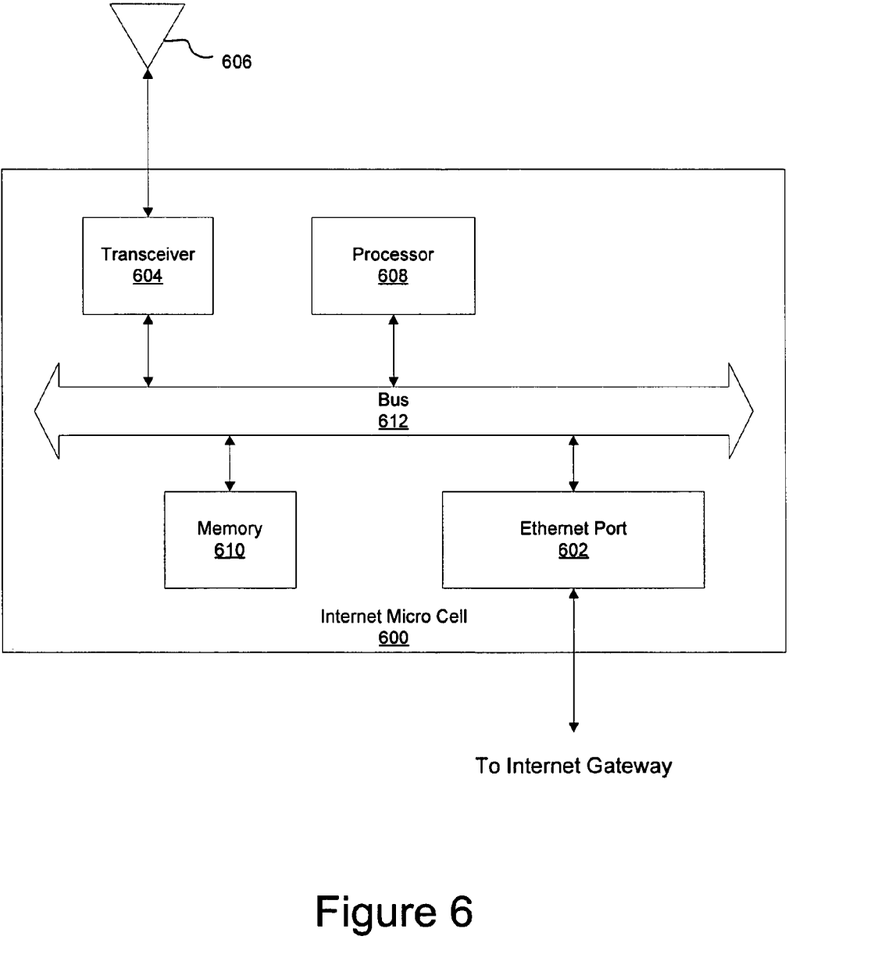
FIG. 6 depicts a block diagram illustrating an exemplary internet micro cell in accordance with one embodiment of the present invention.

With reference now to FIG. 6, a block diagram illustrating an exemplary internet micro cell is depicted in accordance with one embodiment of the present invention. Internet micro cell 600 may be implemented as, for example, internet micro cell 310 depicted in FIG. 3. Internet micro cell includes a processor 608, an antenna 606, a transceiver 604, memory 610, Ethernet port 602, and a bus 612. The bus 612 transfers data, i.e., instructions and information, between each of the devices connected to it. Instructions for performing the various functions necessary for proper functioning of the internet micro cell 600 are stored in memory 610 and executed by processor 608. Signals are received from a wireless mobile telephone and sent to a wireless mobile telephone by transceiver 604 via antenna 606. The wireless signals received through transceiver 604 are converted to data packets that may be transmitted through the internet by processor 608 and sent to an internet gateway through Ethernet port 602. Data packets received from the Internet through Ethernet port 602 are converted into a data protocol compatible with the wireless device and are transmitted to the wireless device through transceiver 604 by means of antenna 606.

Internet micro cell 600 is provided merely as an example of an internet micro cell and is not meant to imply any architectural limitations regarding the present invention. As those skilled in the art will recognize, other components could be included within internet micro cell 600 besides those depicted in FIG. 6. For example, internet micro cell could include a disk drive to store additional information and/or instructions, the functionality of an analog telephone adapter, such as analog telephone adapter 314, or the functionality of a wireless access point, such as, for example, wireless access point 312.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for facilitating communications between devices in a communications network, the network having a wireless service provider telephone switch connected to the Internet, wherein at least one of the devices is a wireless mobile device, the method comprising:
   wirelessly receiving, in a portable internet micro cell device, first data directly from the wireless mobile device, the first data comprising mobile-phone communications of a cellular-mobile-phone protocol, the wireless mobile device configured to communicate with both a communication tower that is communicatively coupled to the wireless service provider telephone switch and the portable internet micro cell device via the cellular-mobile-phone protocol; and
   sending, from the portable internet micro cell device, via a wired Ethernet connection of the portable internet micro cell device, the first data comprising the mobile-phone communications received from the wireless mobile device to the wireless service provider telephone switch, the first data from the wireless mobile device being sent individually via a tunnel through the Internet,
   translating the data from the cellular-mobile-phone protocol into a second protocol prior to sending the data to the wireless service provider telephone switch.

2. The method as recited in claim 1 further comprising:
   receiving second data from the wireless service provider telephone switch via the internet; and
   wirelessly transmitting the second data to the wireless mobile device.

3. The method as recited in claim 2, wherein the second data is received from the wireless service provider telephone switch encoded in a first protocol and further comprising:
   translating the second data from the first protocol to the cellular-mobile-phone protocol prior to wirelessly transmitting the second data to the wireless mobile device.

4. A computer program product in a computer readable media for use in a data processing system for facilitating communications between devices in a communications network, the network having a wireless service provider telephone switch connected to the Internet, wherein at least one of the devices is a wireless mobile device, the computer program product comprising:
   first instructions, resident in a portable internet micro cell device, for wirelessly receiving first data directly from the wireless mobile device, the first data comprising mobile-phone communications of a cellular-mobile phone protocol, the wireless mobile device configured to communicate with both a communication tower that is communicatively coupled to the wireless service provider telephone switch and the portable internet micro cell device via the cellular-mobile-phone protocol; and
   second instructions, resident in a-the portable internet micro cell device, for sending via a wired Ethernet connection of the portable internet micro cell device, the first data comprising the mobile-phone communications received from the wireless mobile device to the wireless service provider telephone switch via a tunnel through the Internet such that the first data is sent individually through the Internet via said tunnel, third instructions for translating the first data comprising the mobile-phone communications into a second protocol prior to sending the data to the wireless service provider telephone switch.

5. The computer program product as recited in claim 4, further comprising:
third instructions for receiving second data from the wireless service provider telephone switch via the internet; and
fourth instructions for wirelessly transmitting the second data to the wireless mobile device.

6. The computer program product as recited in claim 5, wherein the second data is received from the wireless service provider telephone switch encoded in a first protocol and further comprising:
fifth instructions for translating the second data from the first protocol to the cellular-mobile-phone protocol to the wireless mobile device.

7. A system for facilitating communications between devices in a communications network, the network having a wireless service provider telephone switch connected to the Internet, wherein at least one of the devices is a wireless mobile device, the system comprising:
a portable internet micro cell device;
determining means, resident in the wireless mobile device, for determining whether to register with the portable internet micro cell device or with a traditional cell tower, the traditional cell tower communicatively coupled to the wireless service provider telephone switch;
first means, in communication with the internet micro cell device, comprising an antenna configured to receive first data from the wireless mobile device if the determining means determines to register with the portable internet micro cell device, the first data comprising mobile-phone communications of a cellular-mobile-phone protocol the wireless mobile device configured to communicate with both the traditional cell tower and the portable internet micro cell device via the cellular-mobile-phone protocol; and
second means, in communication with the internet micro cell device, comprising a wired Ethernet connection with the Internet for sending the first data comprising the mobile-phone communications received from the wireless mobile device to the wireless service provider telephone switch via a tunnel through the Internet such that the first data is transmitted individually via said tunnel through the Internet,
third means for translating the first data comprising the mobile-phone communications of the cellular-mobile-phone protocol into a second protocol prior to sending the data to the wireless service provider telephone switch.

8. The system as recited in claim 7, further comprising
third means for receiving second data from the wireless service provider telephone switch via the internet; and
fourth means for wirelessly transmitting the second data to the wireless mobile device.

9. The system as recited in claim 8, wherein the second data is received from the wireless service provider telephone switch encoded in a first protocol and further comprising:
fifth means for translating the second data from the first protocol to the cellular-mobile-phone protocol prior to wirelessly transmitting the second data to the wireless mobile device.

10. The method as recited in claim 1, wherein the cellular-mobile-phone protocol comprises one of Advanced Mobile Phone System (AMPS), Code Division Multiple Access (CDMA), Time Division Multiple Access (TDMA), and Global System for Mobile Communications (GSM).

11. The computer program product as recited in claim 4, wherein the cellular-mobile-phone protocol comprises one of Advanced Mobile Phone System (AMPS), Code Division Multiple Access (CDMA), Time Division Multiple Access (TDMA), and Global System for Mobile Communications (GSM).

12. The system as recited in claim 7, wherein the cellular-mobile-phone protocol comprises one of Advanced Mobile Phone System (AMPS), Code Division Multiple Access (CDMA), Time Division Multiple Access (TDMA), and Global System for Mobile Communications (GSM).

* * * * *

UNITED STATES PATENT AND TRADEMARK OFFICE
CERTIFICATE OF CORRECTION

| | | |
|---|---|---|
| PATENT NO. | : 8,059,580 B2 | Page 1 of 1 |
| APPLICATION NO. | : 10/846064 | |
| DATED | : November 15, 2011 | |
| INVENTOR(S) | : Roy G. Grosbach | |

It is certified that error appears in the above-identified patent and that said Letters Patent is hereby corrected as shown below:

In column 8, line 60, in Claim 4, delete "a-the" and insert -- the --, therefor.

In column 9, lines 35-36, in Claim 7, delete "protocol" and insert -- protocol, --, therefor.

Signed and Sealed this
Fourth Day of September, 2012

David J. Kappos
*Director of the United States Patent and Trademark Office*